United States Patent [19]

Okamura et al.

[11] Patent Number: 5,711,782
[45] Date of Patent: Jan. 27, 1998

[54] PROCESS FOR FABRICATING AN OPTICAL FIBER PREFORM

[75] Inventors: Kouji Okamura; Tadao Arima, both of Shimotsuga-gun, Japan

[73] Assignee: Fujitsu Limited, Kawasaki, Japan

[21] Appl. No.: 694,795

[22] Filed: Aug. 9, 1996

Related U.S. Application Data

[60] Continuation of Ser. No. 156,898, Nov. 24, 1993, abandoned, which is a division of Ser. No. 63,046, May 19, 1993, Pat. No. 5,284,500, which is a division of Ser. No. 687,869, Jun. 4, 1991, abandoned.

[30] Foreign Application Priority Data

| Oct. 31, 1989 | [JP] | Japan | 1-281843 |
| Nov. 8, 1989 | [JP] | Japan | 1-288732 |
| Nov. 8, 1989 | [JP] | Japan | 1-288733 |
| Nov. 8, 1989 | [JP] | Japan | 1-288734 |
| Oct. 31, 1990 | [WO] | WIPO | PCT/JP90/01398 |

[51] Int. Cl.⁶ .................................................. C03B 37/014
[52] U.S. Cl. ........................ 65/390; 65/399; 65/404; 65/417; 65/108
[58] Field of Search ......................... 65/390, 395, 399, 65/404, 417, 108, 295

[56] References Cited

U.S. PATENT DOCUMENTS

| 3,894,857 | 7/1975 | Uchida et al. . | |
| 3,961,926 | 6/1976 | Asam | 65/3.12 |
| 4,311,501 | 1/1982 | Fort | 65/399 |
| 4,341,441 | 7/1982 | Lighty et al. . | |
| 4,597,787 | 7/1986 | Jacobson . | |
| 4,610,708 | 9/1986 | Sarhangi et al. | 65/3.12 |
| 4,620,861 | 11/1986 | Berkey | 65/399 |

(List continued on next page.)

FOREIGN PATENT DOCUMENTS

| 0294977 | 10/1988 | European Pat. Off. . | |
| 0 331 942 | 4/1989 | European Pat. Off. . | |
| 0313209 | 4/1989 | European Pat. Off. . | |
| 0 372 550 | 6/1990 | European Pat. Off. . | |
| 63-45143 | 2/1988 | Japan | 65/399 |
| 63-144137 | 6/1988 | Japan | 65/399 |

OTHER PUBLICATIONS

PROCEEDINGS SPIE–INT. SOC. OPT. ENG., vol. 1771, 1990, "Aluminum/Erbium Active Fibre Manufactured by a Non–Aqueous Solution Doping Method," by L. Cognolato et al., pp. 202–208.

J. OF MATERIAL SCIENCE LETTERS, vol. 9, No. 12, 1990, "Fabrication of an Active Optical Fibre by a Non–Aqueous Solution Doping Method and Its Characterization," by L. Cognolato et al.

(List continued on next page.)

*Primary Examiner*—John Hoffmann
*Attorney, Agent, or Firm*—Staas & Halsey

[57] ABSTRACT

A first process of the invention comprises forming two constricted portions (28) at a quartz reaction tube (4), charging a solution of a compound of a rare earth element as a solution into the section between the constricted portions (28) for doping. By this, the doping concentration becomes uniform along the length of an optical fiber preform (30) with defects being rarely produced. This process does not involve any complicated operation. A second process of the invention comprises impregnating a solution in the form of a mist in a soot-like core glass (26) by which it becomes possible to control the doping concentration in high accuracy. A third process of the invention comprises impregnating a solution while controlling the concentration in response to a quantity of a transmitted laser beam through a soot-like core glass (26), by which the doping concentration is ensured independently of the density of the soot-like core glass. A fourth process of the invention comprises repeating formation of a soot-like core glass (26) at different temperatures, by which a distribution of a doping concentration along the radial direction of the core can be arbitrarily set.

16 Claims, 12 Drawing Sheets

U.S. PATENT DOCUMENTS

| | | |
|---|---|---|
| 4,666,247 | 5/1987 | MacChesney et al. |
| 4,680,046 | 7/1987 | Matsuo et al. |
| 4,680,048 | 7/1987 | Motoki et al. |
| 4,728,350 | 3/1988 | Cocito ......................................... 65/3.12 |
| 4,786,302 | 11/1988 | Osafune et al. ........................... 65/3.12 |
| 4,787,927 | 11/1988 | Mears et al. ............................... 65/3.12 |
| 4,799,946 | 1/1989 | Ainslie et al. ............................. 65/3.12 |
| 4,826,288 | 5/1989 | Mansfield et al. |
| 4,848,998 | 7/1989 | Snitzer et al. |
| 4,885,018 | 12/1989 | Bachmann et al. ........................ 65/901 |
| 4,936,650 | 6/1990 | Ainslie et al. |
| 4,952,225 | 8/1990 | Le Sergent et al. ....................... 65/3.12 |
| 4,952,226 | 8/1990 | Frazee et al. .............................. 65/3.12 |
| 4,957,526 | 9/1990 | Frazee et al. .............................. 65/3.11 |
| 5,047,076 | 9/1991 | Cognolato et al. ........................ 65/901 |
| 5,123,940 | 6/1992 | Di Giovanni ............................... 65/399 |
| 5,282,079 | 1/1994 | Laming et al. |

OTHER PUBLICATIONS

PATENT ABSTRACTS OF JAPAN, vol. 13, No. 504 (C–653) (3852), Nov. 1989 & JP–A–01 203 236 (Seiko Epson Corp.).

OPTICAL FIBER COMMUNICATION CONFERENCE, 1989 TECHNICAL DIGEST SERIES, CONFERENCE EDITION, vol. 5, Feb. 1989, "Fabrication and Analysis of Nd–Doped Silica–Based Optical Fibers," M.S. Saifl, p. 19.

MATERIALS LETTERS, vol. 6, No. 5/6, Mar. 1988, "The Fabrication, Assessment and Optical Properties of High–Concentration ND(3+)–and Er (3+)–Doped Silica––Based Fibres," pp. 139–144.

ELECTRONICS LETTERS, vol. 23, No. 7, Mar. 26, 1987, "Solution–Doping Technique for Fabrication of Rare–Earth–Doped Optical Fibres," by J.E. Townsend et al., pp. 329–331.

EUROPEAN CONFERENCE ON OPTICAL COMMUNICATION EOCC 88, Sep. 11–15, part 1, Brighton, UK, IEE Conference Publication, vol. 292, "Fabrication of Al2O3 Co–Doped Optical Fibres by a Solution–Doping Technique," S.B. Poole, pp. 433–436.

ELECTRONIC LETTERS, Aug. 15, 1985, vol. 21, No. 17, pp. 737–738, "Fabrication Of Low Loss Optical Fibres," Poole et al., pp. 737–738.

Paul Urquhart, *REVIEW OF RARE EARTH DOPED FIBRE LASERS AND AMPLIFIERS*, IEEE Proceedings, vol. 135, Pt. J, No. 6 (Dec. 1988), pp. 385–407.

S. B. Pool, et al., *FABRICATION OF OPTICAL FIBRES CONTAINING LOW LEVELS OF RARE–EARTH IONS,* IOOC –ECOC '85, pp. 11–13.

Simon B. Poole, et al., *FABRICATION AND CHARACTERIZATION OF LOW–LOSS OPTICAL FIBERS CONTAINING RARE–EARTH IONS*, Journal of Lightwave Technology, vol. LT–4, No. 7 (Jul. 1986), pp. 870–875.

D.N. Payne, et al., *FIBRE LASERS*, DOPS–NYT (Jan. 1987), pp. 7–10.

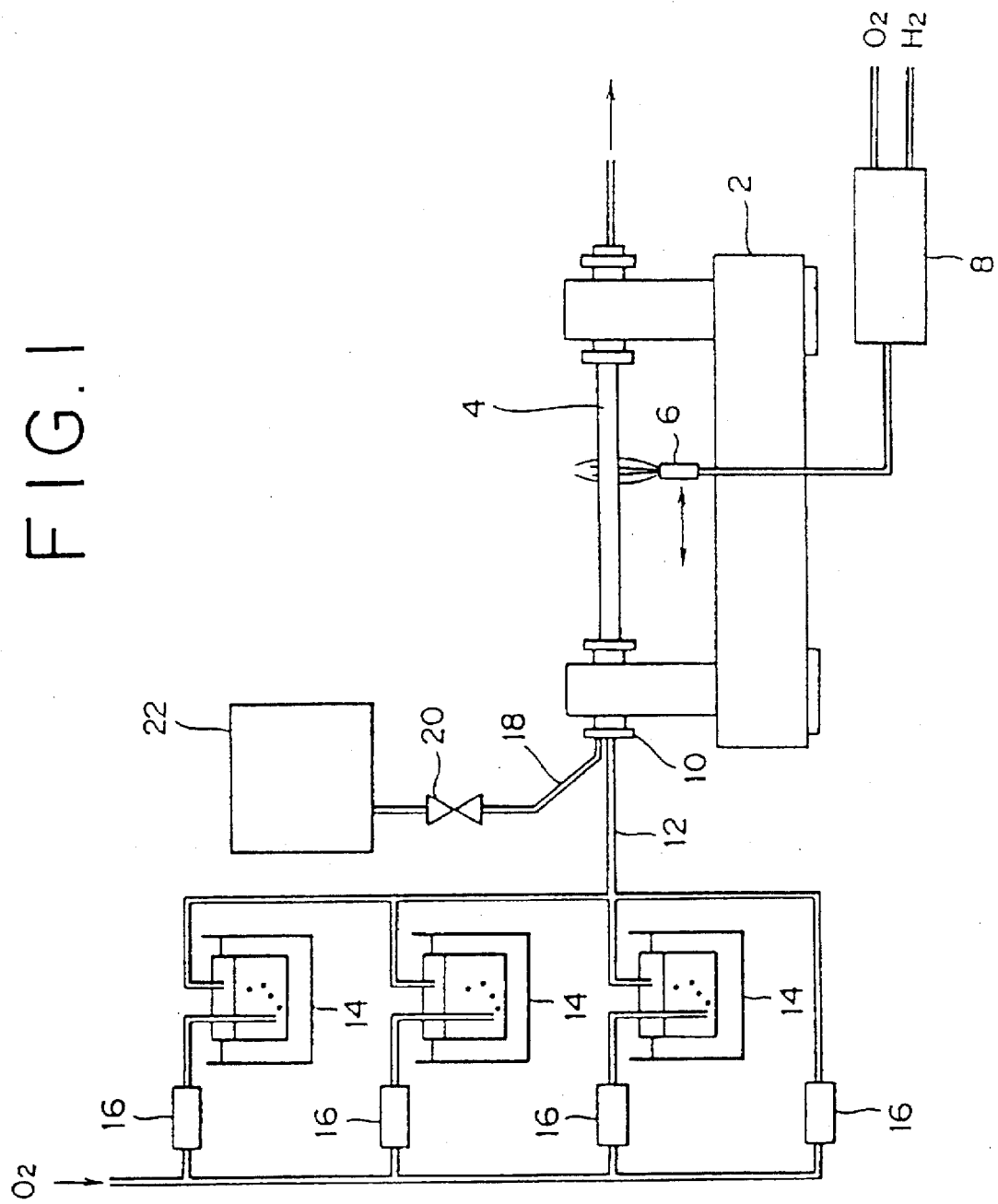
FIG. I

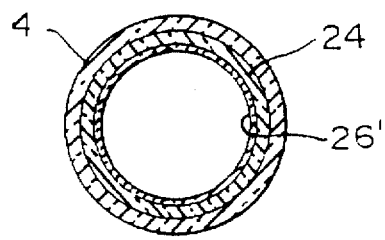
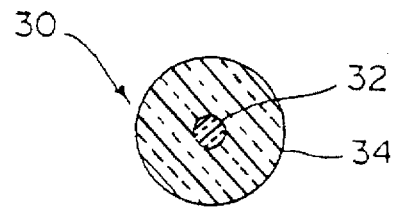
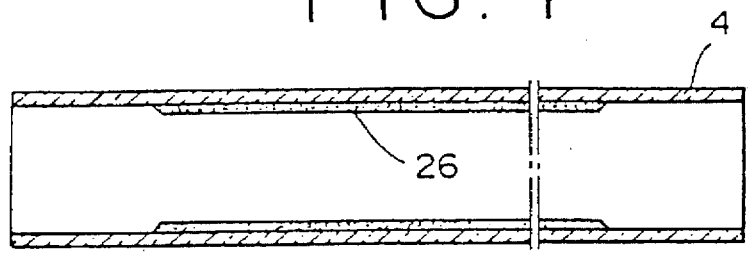
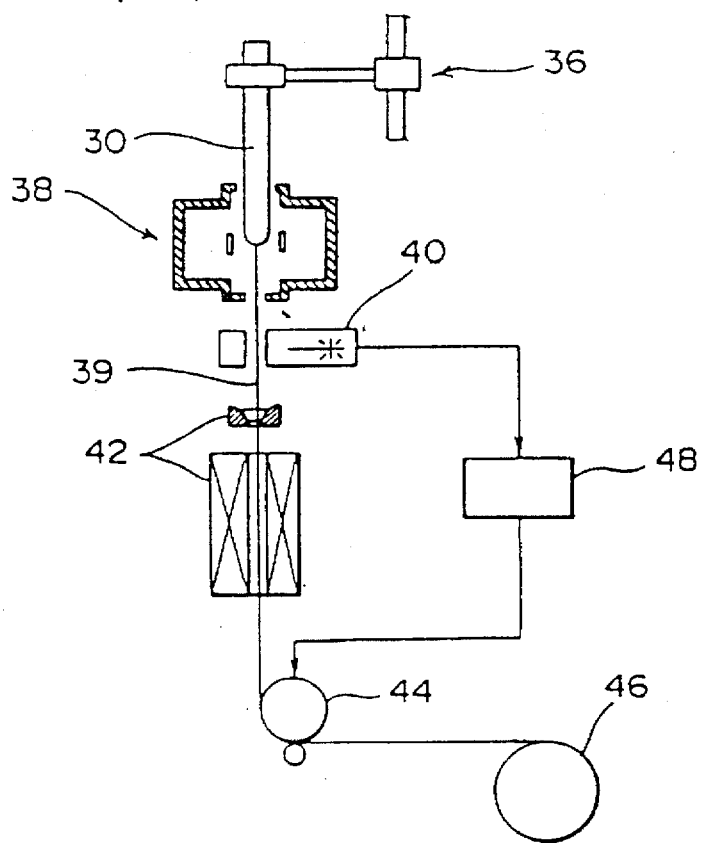

FIG.12
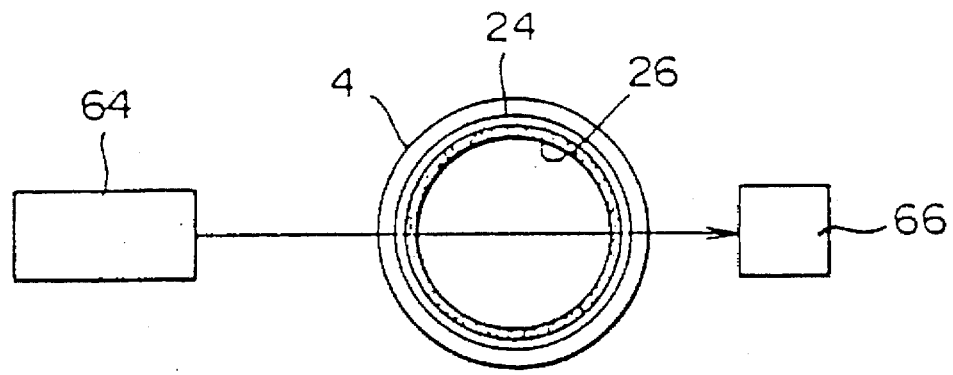
FIG.13A  FIG.13B
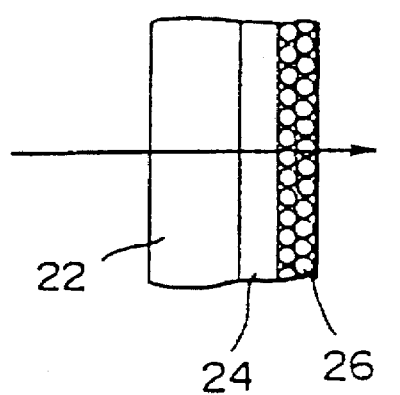
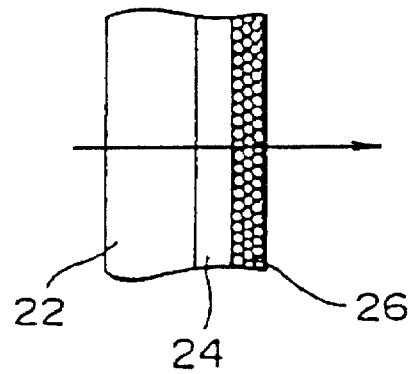

PROCESS FOR FABRICATING AN OPTICAL FIBER PREFORM

This application is a continuation of application Ser. No. 08/156,898, filed 24 Nov. 1993, now abandoned, which is a division of application Ser. No. 08/063,046, filed May 19, 1993, now U.S. Pat. No. 5,284,500 which is a division of application Ser. No. 07/687,869, filed on Jun. 4, 1991, now abandoned.

BACKGROUND OF THE INVENTION

The present invention relates to a process for fabricating an optical fiber preform and more particularly, to a process for fabricating an optical fiber preform which is suitable for production of an optical fiber whose core is doped with a rare earth element (or ion).

Light amplifiers in which light signals are directly amplified without conversion into electric signals have been extensively studied in various research and investigation facilities and are expected as a key device of future light transmission systems. This is because the light amplifier is, in fact, free of any bit rate, has a large capacitance and information from a multichannel can be amplified as a whole. One type of such a light amplifier is a light amplifier which makes use of an optical fiber whose core is doped with a rare earth element (or ion) such as Er, Nd, Yb or the like (which is hereinafter referred to simply as "doped fiber") and wherein signal light and pumping light are introduced into the doped fiber in the same or opposite directions. The optical fiber amplifier using the doped fiber has the advantages that the gain is not polarization dependent with respect to low noises and that the combination loss with a transmission path is small. This type of optical fiber amplifier may be particularly applied in the following manner.

(a) At the transmission side, the optical fiber amplifier is employed as an optical power booster to compensate for a possible loss or to increase the transmission power.

(b) At the receiving side, the optical fiber amplifier is used as an optical pre-amplifier to improve the receiving sensitivity.

(c) The optical fiber amplifier is used as a repeater to make a small-sized and reliable repeater.

With light whose wavelength is in the range of 0.8–1.6 μm, production and application techniques of optical fibers using quartz glass adapted for long-range transmission have been established. The optical fiber is obtained by drawing an optical fiber preform in the form of a thick rod. The optical fiber preform should have a compositional gradient along the section thereof which is properly formulated as designed. A typical and known method of producing an optical fiber preform is one wherein a glass composition formed by chemical conversion of reactant gases is deposited on a quartz reaction tube such as by MCVD (modified chemical vapour deposition). In the MCVD process, reactant gases such as, for example, $SiCl_4$ and $O_2$ have been charged into the quartz reaction tube and heated to a level necessary for the reaction. While the heating zone or section is moved along the length of the quartz reaction tube, a fresh glass layer is deposited on the inner wall surface of the tube. A number of layers, e.g. 20–30 layers, are repeatedly deposited. The respective layers are individually controlled in composition, so that the composition of an optical fiber along the section obtained from the preform can thus be controlled. After deposition of the layers to a satisfactory extent, the quartz reaction tube is collapsed to obtain a rod-shaped optical fiber preform. This optical fiber preform is drawn to obtain an optical fiber.

In the MCVD process, it is usual to employ reactant substances which are able to be gasified at room temperature. For instance, $SiCl_4$ is used for obtaining $SiO_2$ which is a main constituent of the optical fiber and $GeCl_4$ is used for obtaining $GeO_2$ used to control a refractive index.

For the production of doped fibers, it is not possible to obtain reactant substances of rare earth elements which are gasified at room temperature, like $SiCl_4$ and $GeCl_4$. For this reason, a practically satisfactory concentration of doped rare earth elements cannot be obtained only by the MCVD technique. Accordingly, there have been proposed methods of attaining a practically satisfactory concentration of rare earth elements in the following manner.

One of the hitherto proposed methods for fabricating optical fiber preforms adapted for producing doped fibers is a method wherein when a core glass is formed on the inner surface of a quartz reaction tube according to the MCVD technique, a compound of a rare earth element accommodated in a chamber formed at one end portion of the quartz reaction tube is heated with a burner and gasified. The gas is introduced into the quartz reaction tube along with a reactant substance which has been gasified at room temperature and is used as a core material, thereby depositing a core glass doped with the rare earth element. Another hitherto proposed method for producing a doped fiber is one which comprises the steps of (a) depositing a core glass in the form of soot on the inner surface of a quartz reaction tube so that the core glass is not vitrified, (b) immersing the quartz reaction tube, wherein the soot-like glass has been deposited, in a solution containing a compound of a rare earth element as a solute, thereby impregnating the solution in the soot-like core glass, and (c) drying the solution and collapsing the tube.

With the former method, the vapor pressure of the rare earth element compound is so low that the compound is liable to settle out and the quartz reaction tube has an inevitable temperature distribution along the length thereof. Accordingly, the concentration of the doped rare earth element is apt to become non-uniform especially along the length of the optical fiber preform. In addition, it is difficult to accurately control the concentration of the doped rare earth element.

With the latter method, it is necessary that after deposition of the soot-like core glass on the inner surface of the quartz reaction tube mounted on a lathe, the quartz reaction tube is once removed from the lathe and immersed in the solution. Subsequently, the quartz reaction tube is again set on the lathe and subjected to a collapsing step and the like, with attendant disadvantages that the method requires complicated operations with defects being likely to be produced. If the distribution in concentration of a rare earth element is caused to be produced along the radial direction of the optical fiber preform, it is necessary to immerse the quartz reaction tube in the solution a plurality of times. The above disadvantages are inevitable.

In the latter method, the amount of the impregnated solution in the soot-like core glass may vary depending on the conditions of the soot-like core glass including a grain size, leading to the problem that highly accurate control of the concentration of the doped rare earth element is difficult. If the doping concentration of the rare earth element is scattered, the gain and an optimum pumping light wavelength are also scattered in the optical fiber amplifier formed of the doped fiber. This is why the concentration of the doped rare earth element has to be controlled with high accuracy.

The mode field of propagating light of an optical fiber has a so-called Gaussian distribution where the amplitude of the electric field is made high at the central portion of the core. Accordingly, the best amplification characteristic is not necessarily obtained when the distribution of the doping concentration of the rare earth element is constant along the radial direction of the core. Proper control of the concentration distribution of the rare earth element may enable one to obtain optical amplification in an efficient manner. In this sense, the concentration distribution of the rare earth element along the radial direction of the core should preferably be set in an arbitrary way.

SUMMARY OF THE INVENTION

A first object of the invention is to provide a process for producing an optical fiber preform wherein a doping concentration of a rare earth element is uniform along the length of an optical fiber preform.

A second object of the invention is to provide a process for producing an optical fiber preform which is simple in operation and wherein defects are unlikely to be produced.

A third object of the invention is to provide a process for producing an optical fiber preform wherein a concentration of a doped rare earth element can be controlled with high accuracy.

A fourth object of the invention is to provide a process for producing an optical fiber preform wherein a distribution in concentration of a rare earth element along a radial direction of a core can be arbitrarily set.

A fifth object of the invention is to provide a process for producing an optical fiber preform whereby a doped fiber adapted for efficient light amplification can be realized.

The first process of the invention for mainly achieving the first, second and fifth objects comprises the steps of forming a soot-like core glass by heating fine powder of an oxide glass deposited by vapor phase reaction in a quartz reaction tube, heating the quartz reaction tube to form a constricted portion of the quartz reaction tube at opposite sides of the soot-like core glass, charging a solution containing a compound of a rare earth element as a solute inbetween the constricted portions of the quartz reaction tube, thereby permitting the solution to be impregnated in the soot-like core glass, evaporating a solvent of said solution charged into the quartz reaction tube, heating the solute-containing soot-like core glass until the glass is consolidated, and heating the quartz reaction tube for collapsing.

The second process of the invention for mainly achieving the second, third and fifth objects comprises a first step of forming a soot-like core glass by heating fine powder of an oxide glass deposited by vapor phase reaction in a quartz reaction tube, a second step of spraying a solution of a compound of a rare earth element used as a solute against the soot-like core glass thereby permitting the solution to be impregnated in the soot-like core glass, a third step of heating the solute-containing a soot-like core glass until the glass is vitrified, and fourth step of heating the quartz reaction tube for collapsing.

The third process of the invention for mainly achieving the third, fourth and fifth objects comprises a first step of forming a soot-like core glass by heating fine powder of an oxide glass deposited by vapor phase reaction in a quartz reaction tube, a second step of transmitting a laser beam through the quartz reaction tube in which the soot-like core glass has been formed, thereby measuring a quantity of transmitted light, a third step of charging a solution of a compound of a rare earth element used as a solute into the quartz reaction tube in a controlled amount depending on the quantity of the transmitted light, thereby permitting the solution to be impregnated in the soot-like core glass, a fourth step of heating the solute-containing soot-like core glass until the glass is consolidated, and a fifth step of heating the quartz reaction tube for collapsing.

When a laser beam is transmitted through the quartz reaction tube in which the soot-like core glass has been formed thereby to measure a quantity of transmitted light, the density of the soot-like core glass is made clear, from which it will be seen how much the solution can be impregnated in the soot-like core glass. If the concentration of the solution is made constant, the amount of the solute being incorporated in the core will be determined. The amount of the solute in the core corresponds to a doping concentration of a rare earth element in the core. For controlling the doping concentration of the rare earth element in the core at a desired level, it will be sufficient to control the concentration of the solution depending on the quantity of transmitted light. Thus, according to the third process of the invention, the concentration of the doped rare earth element in the core can be controlled with high accuracy.

In this connection, the concentration of the solution in the third step is so controlled that it is decreased with an increasing quantity of the transmitted light. By this, the doping concentration of the rare earth element in the core can be made constant irrespective of the properties of the soot-like core glass.

Moreover, when the solutions are prepared to have different concentrations in the third step relative to a given quantity of transmitted light, the first to fourth steps are repeated a plurality of times in this order, by which the distribution in concentration of the rare earth element in the core can be arbitrarily controlled.

When the concentration of the solution for a given quantity of transmitted light in the third step is made higher whenever the first to fourth steps are repeated, there is obtained such a concentration distribution that the resulting core has an increasing concentration of the doped rare earth element from the outer surface toward the central portion of the core. Thus, it will be possible to provide an optical fiber preform from which there can be produced a doped fiber suitable for conducting light amplification in an efficient manner.

The fourth process of the invention for mainly achieving the fourth and fifth objects comprises a first step of forming a soot-like core glass by heating fine powder of an oxide glass deposited by vapor phase reaction in a quartz reaction tube, a second step of impregnating a solution of a compound of a rare earth element used as a solute in the soot-like core glass, a third step of heating the solute-containing soot-like core glass until the glass is consolidated, and a fourth step of heating the quartz reaction tube for collapsing provided that the first step is repeatedly effected a plurality of times while using different heating temperatures for the fine powder of oxide glass.

According to the fourth process of the invention, the density of the soot-like core glass formed on the inner walls of the quartz reaction tube will be varied along the radial direction of the quartz reaction tube. The reason why the density of the soot-like core glass varies depending on the heating temperature of the oxide glass fine powder is that when the soot-like core glass is formed from the oxide glass fine powder, the grain size varies depending on the heating temperature condition. If the density of the soot-like core glass is relatively high, the space occupation rate of the glass at the portion becomes relatively high. When the solution is impregnated in the soot-like core glass, the amount of solution which can be impregnated per unit volume of the soot-like core glass can be relatively reduced. On the other hand, when the density of the soot-like core glass is relatively low, the space occupation rate of the glass at the portion becomes relatively low. The amount of solution which can be impregnated per unit volume of the soot-like core glass can be relatively increased. Accordingly, proper control of the heating temperature of the oxide glass fine powder at the time when the soot-like core glass is formed ensures an arbitrary level of the concentration distribution of the rare earth element in the optical fiber preform obtained after collapsing.

In this connection, if the heating temperature of the oxide glass fine powder is made lower whenever the first step is repeated, the concentration distribution of the rare earth element in the resulting optical fiber preform is such that the concentration of the rare earth element at the central portion of the core is the highest. Thus, it will be possible to provide an optical fiber preform from which a doped fiber suitable for efficient light amplification can be realized.

In the first to fourth processes of the invention, where the soot-like core glass is formed on a clad glass film which has been formed on the inner walls of the quartz reaction tube, thermal diffusion of impurities from the quartz reaction tube such as in the collapsing step can be inhibited. In this case, if a quartz reaction tube with a low impurity is used, the loss can be suppressed to a low level.

Further, if the soot-like core glass is directly formed on the inner walls of a quartz reaction tube in the first to fourth processes of the invention, the production procedure can be simplified.

BRIEF DESCRIPTION OF THE DRAWINGS

FIG. 1 is a schematic view of an arrangement of an apparatus for producing an optical fiber preform used to carry out a first process of the invention:

FIGS. 3A and 3B are, respectively, cross-sectional views of a quartz reaction tube prior to and after collapsing according to a preferred embodiment of the first process of the invention:

FIG. 4 is a longitudinal sectional view of a quartz reaction tube for illustrating an additional preferred embodiment of the first process of the invention;

FIG. 5 is a schematic view of an arrangement of a drawing apparatus used to producing an optical fiber from an optical fiber preform;

FIG. 12 is a diagram of the measurement of a quantity of transmitted light in an embodiment of the third process of the invention;

FIGS. 13A and 13B are, respectively, diagrams of the interrelation between the density of a soot-like core glass and the quantity of transmitted light in the embodiment of the third process of the invention;

DESCRIPTION OF THE PREFERRED EMBODIMENTS

Figure 2A:
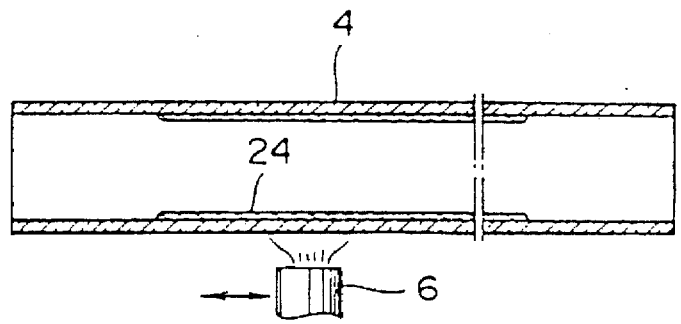
FIGS. 2A–2E are, respectively, illustrative views of production steps of an optical fiber preform according to a preferred embodiment of the first process of the invention.

Preferred embodiments of the invention are described in detail with reference to the accompanying drawings.

FIG. 1 shows an arrangement of an optical fiber preform production apparatus used to carry out the first process of the invention. Reference numeral 2 indicates a lathe for glass manufacture which rotatably supports a quartz reaction tube 4, and reference numeral 6 indicates a burner which is reciprocatingly moved on the lathe 2 along the length of the quartz reaction tube 4 to heat the quartz reaction tube 4 from outside. Reference numeral 8 indicates a temperature control unit for controlling the burning condition of the burner 6 by controlling flow rates of $O_2$ and $H_2$ to be fed to the burner 6. The quartz reaction tube 4 has a connector 10 at one end thereof, which is, in turn connected to a gas feed pipe 12. Starting gases and other gases such as $O_2$ are charged through the gas feed pipe 12 into the quartz reaction tube 4. Reference numeral 14 indicates a feeder for starting gases such as $SiCl_4$, $GeCl_4$ and the like, and the feed rates are controlled by the flow rate of a carrier gas such as $O_2$ which is fed through a mass flow meter 16. The connector 10 is connected with a solution feed pipe 18 along with the gas feed pipe 12. The solution feed pipe 18 is connected through a valve 20 to a solution tank 22. When the valve 20 is opened, a solution in the tank 22 is input to the quartz reaction tube 4. It will be noted that the connection portions between the gas feed pipe 12 and the quartz reaction pipe 4 and also between the solution feed pipe 18 and the quartz reaction pipe 3 through the connector 10 are sealed in a usual manner. By this, a closed system is established in the quartz reaction tube 4.

FIGS. 2A–2E are diagrams of production steps of an optical fiber preform in a preferred embodiment of the first process of the invention. The production process of the optical fiber preform is described with reference to these figures and FIG. 1.

As shown in FIG. 2A, while rotating the quartz reaction tube 4 in which the starting gases and the carrier gas have been fed, the tube 4 is heated with the burner 6 from the outside, whereupon fine powder of an oxide glass is deposited in the reaction tube 4 to provide a clad. This fine powder is instantaneously consolidated upon heating with the burner 6. The reciprocating movement of the burner 6 is repeated a plurality of times and results in uniform formation of a clad glass film 24 having a predetermined refractive index and thickness on the inner walls of the reaction tube 4. The reaction tube is designed to have an outer diameter, an inner diameter and a length, for example, of 22 mm, 18 mm and 700 mm, respectively. The starting gas composition is so controlled that the refractive index of the clad glass film 24 is equal to that of the quartz reaction tube 4.

Figure 2B:
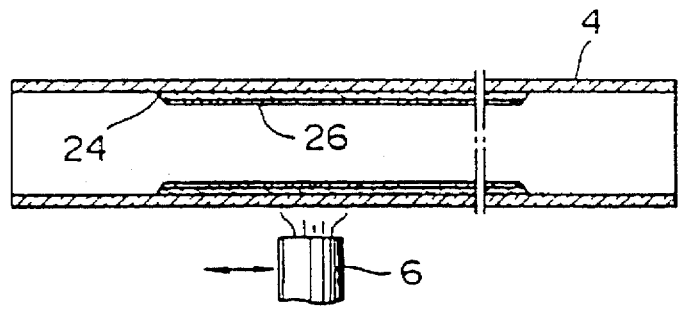

Subsequently, after control of a starting gas composition and the heating temperature with the burner 6, the quartz reaction tube 4 is likewise heated with the burner from outside. Consequently, a oxide glass fine powder serving as a core is deposited on the clad glass film 24. The fine powder is porously deposited on the clad glass film 24. The reciprocating movement of the burner is repeated a plurality of times, with the result that a soot-like core glass 26 is formed on the clad glass film 24 as shown in FIG. 2B. The starting gas composition is so formulated that when the soot-like core glass 26 is consolidated as described hereinafter, its refractive index is higher than the refractive index of the clad glass film 24.

Figure 2C:
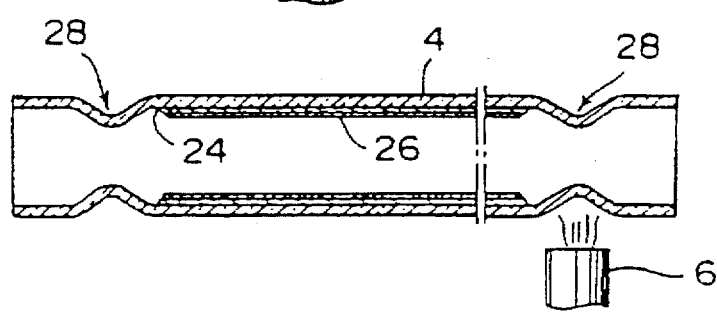
Figure 2D:
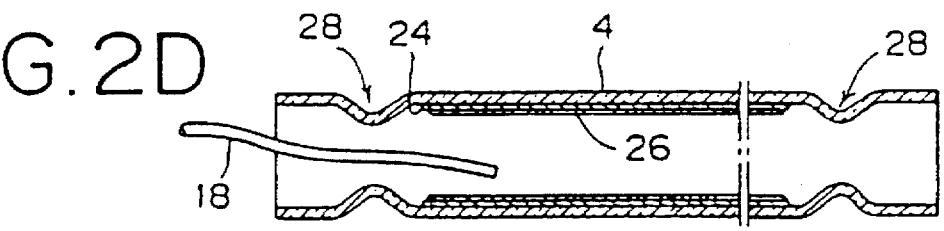

As shown in FIG. 2C, the burner 6 is moved to a position in the vicinity of an end portion of the reaction tube 4, after which while rotating, the reaction tube 4 is locally heated, thereby forming a constricted portion 28 with a smaller diameter at the heated portion. Two constricted portions 28 are formed at opposite sides of the tube between which the soot-like core glass 26 has been formed.

When the reaction tube 4 and the like are cooled down to an appropriate temperature, the solution feed pipe 18 is composed, for example, of a Teflon resin inserted into the reaction tube 4 such that its tip is at a position between the constricted portions 28. In this condition, a solution of a compound of a rare earth element as a solute is poured between the constricted portions 28 of the reaction tube 4. When the solution is poured into the reaction tube 4, it impregnates only the porous soot-like core glass 26. The solution of the rare earth element compound as a solute is, for example, an alcohol solution of $ErCl_3 \cdot 6H_2O$. The alcohol is preferably ethanol. The concentration of the solution is, for example, in the range of 0.001–1 wt % and the feed of the solution is, for example, in the range of 5–20 ml. The concentration of the rare earth element doped in the core is determined depending on the amount and concentration of the solution impregnated in the soot-like core glass 26. Since the amount of the impregnated solution is uniform along the length of the reaction tube 4, the uniform concentration of the doped element can be obtained along the length of the reaction tube.

Thereafter, the solution feed pipe 18 is removed and dry $N_2$ gas is fed into the reaction tube to gently evaporate the alcohol and water. Remaining moisture should be removed to a satisfactory extent by feeding $Cl_2$ and $O_2$ in the reaction tube 4 and also by heating the reaction tube with the burner 6.

Figure 2E:
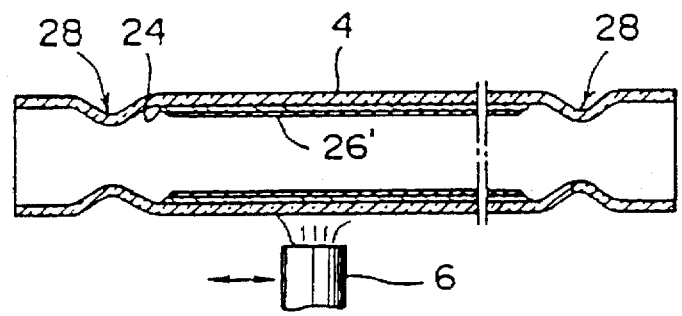

Then, the soot-like core glass 26 is vitrified by heating with the burner 6 which is reciprocatingly moved as shown in FIG. 2E, thereby forming a core glass film 26' on the clad glass film 24.

Finally, the quartz reaction tube 4 is heated at higher temperatures for collapsing to obtain an optical fiber preform. The formation of the core glass film 26' and collapsing may be made at the same time.

The cross sections of the quartz reaction tube 4 prior to and after the collapsing are shown in FIGS. 3A and 3B, respectively. An optical fiber preform 30 obtained after the collapsing is composed of a core-forming portion 32 which is shaped as a core after drawing and a clad-forming portion 34 which is formed as a clad. The core-forming portion 32 corresponds to the core glass film 26' prior to the collapsing and the clad-forming portion 34 corresponds to the clad glass film 24 and the quartz reaction tube 4 prior to the collapsing.

In the first process of the invention, the solution poured between the constricted portions of the quartz reaction tube under which the solution is allowed to be impregnated with the soot-like core glass. Accordingly, it is not necessary to remove the reaction tube from a lathe, as in prior art processes, when the solution is impregnated. The pouring of the solution into the section between the constricted portions of the reaction tube can be made from one side of the reaction tube, so that a closed system including the feed system of the starting gases can be maintained, without any possibility that the reaction tube is contaminated with impurities to degrade loss characteristics. With prior art processes, when the reaction tube is removed from the lathe and immersed in a solution, reaction products unstably deposited at an exhaust side of the reaction tube are deposited on the soot-like core glass, thereby forming defects. On the contrary, with the first process of the present invention such defects are prevented from occurring.

The first process of the invention has the following features. In general, in the collapsing step wherein the quartz reaction tube is heated to high temperatures, there takes place a reaction which is reverse to a conversion reaction of chlorides into oxides. As a result, the concentration of the dopant in the surface layer of the core glass film corresponding to the central portion of the optical fiber preform is lowered. Where a rare earth element is doped in the core, it is preferred that the rare earth element is present at a high concentration at the central portion of the core where an optical power density is high in order to ensure efficient light amplification. With this in mind, it is preferred that the rare earth element is present at a higher concentration in the surface layer of the soot core glass. In the first process of the present invention, when a solution is charged into the section between the constricted portions of the reaction tube in amounts greater than an amount sufficient to permit the soot-like core glass to be impregnated therewith, a larger amount of the solute is left on or in the surface layer of the soot-like core glass after evaporation of the solvent. In this sense, the first process of the invention is suitable for fabricating a doped fiber which allows light amplification in an efficient manner.

According to the first process of the invention, since all the steps of producing the optical fiber preform can be performed in such a state that the quartz reaction tube 4 is mounted on the lathe 2, any complicated operation such as removal of the reaction tube from the lathe or the attachment of the tube to the lathe is not necessary.

FIG. 4 is a longitudinal sectional view of the quartz reaction tube for illustrating another preferred embodiment with respect to the first process of the invention, which corresponds to that of FIG. 2B in the first embodiment. In this embodiment, the soot-like core glass 26 is directly formed on the inner walls of the quartz reaction tube 4, and is subsequently processed in the same manner as in the afore-described embodiment to obtain an optical fiber preform. In this case, the soot-like core glass 26 corresponds finally to the core-forming portion 32 shown in FIG. 3B, and the quartz reaction tube 4 corresponds to the clad-forming portion 34.

FIG. 5 is a schematic diagram of an arrangement of a drawing apparatus for drawing the optical fiber preform into an optical fiber. Indicated at 36 is an optical fiber preform feed unit gradually feeding the optical fiber preform 30 in a downward direction. At 38 is a heating furnace where the optical fiber preform is heated and melted at a lower end portion thereof. 39 is a drawn doped fiber 40 is a fiber diameter measuring unit for measuring the diameter of the doped fiber in a contact-free condition, 42 is a coating unit for coating the doped fiber 39 with, for example, a resin, 44 is a capstan roller rotating at a controlled speed, 46 is a takeup unit for taking up the doped fiber 39 fed from the capstan roller 44, and 48 is a fiber diameter control unit for feedback control of the rotation speed of the capstan roller 44 to keep a constant diameter measured with the diameter measuring unit 40. The use of the drawing apparatus and the optical fiber preform 30 ensures production of a doped fiber whose characteristics such as a concentration of the doped rare earth element and the fiber diameter become stable along the length.

Figure 6:
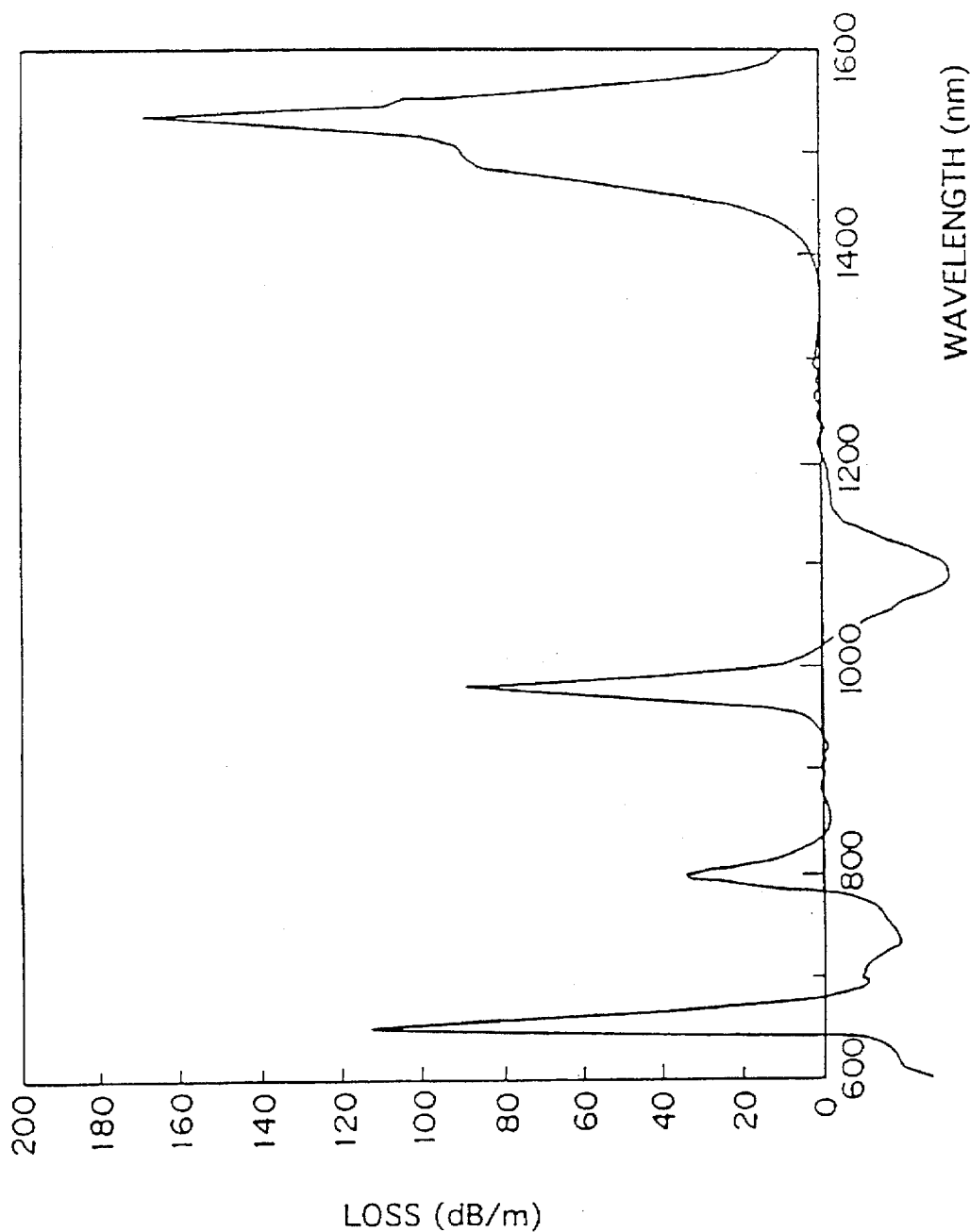
FIG. 6 is a graph showing the relationship between loss and wavelength in a doped fiber produced from an optical fiber preform obtained in the first process of the invention.

The absorbed wavelength characteristic of the thus obtained doped fiber is shown in FIG. 6. The ordinate axis indicates an absorption loss (db/m) and the abscissa axis indicates a wavelength of light used for the measurement (nm). For the measurement, a 0.1 m long doped fiber was used. From FIG. 6, it is confirmed that absorption peaks of $Er^{3+}$ is clearly recognized and the doped fiber can be used as an optical fiber amplifier.

Figure 7:
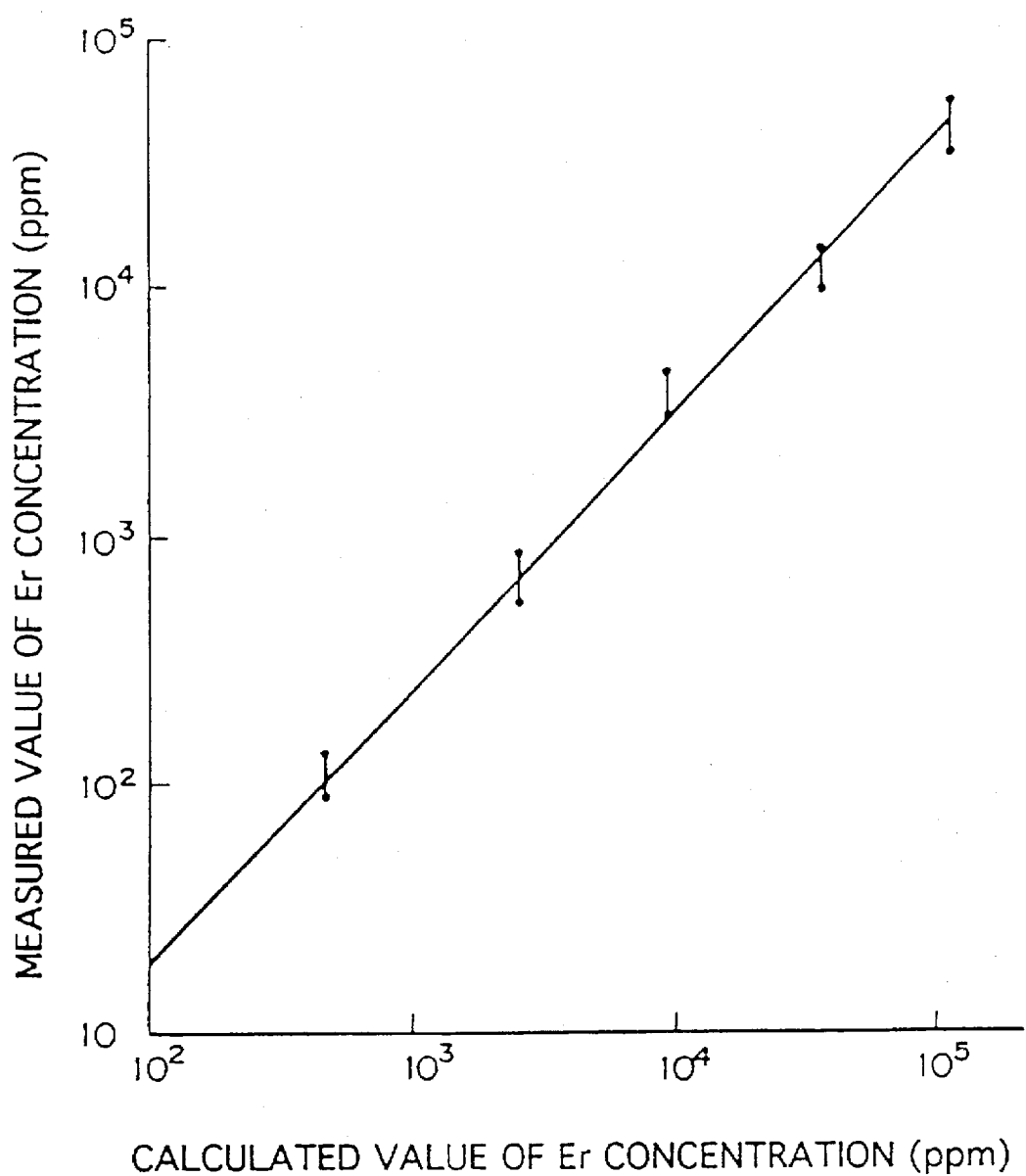
FIG. 7 is a graph showing the relationship between the measured and calculated values of an Er-doped concentration in the doped fiber.

FIG. 7 is a graph showing the relation between the measured value of the Er concentration in the core (based on the absorbed wavelength characteristic) and the calculated value of the concentration of Er in the charged solution relative to the total amount of the core glass. From FIG. 7, it can be seen that the concentration of Er in the core can be set at a desired level.

Figure 8:
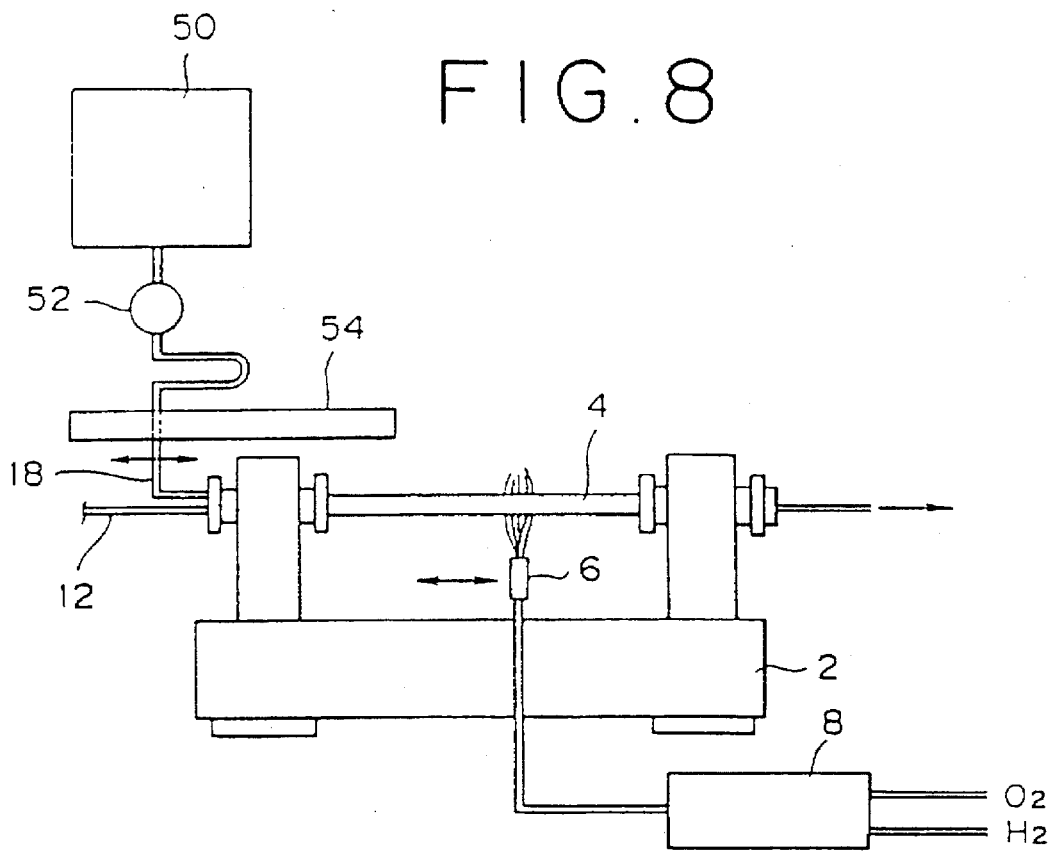
FIG. 8 is a schematic diagram of an arrangement of an optical fiber preform producing apparatus used to carry out a second process of the invention.

FIG. 8 is a schematic diagram of an arrangement of a main part of an optical fiber preform-producing apparatus used to carry out the second process of the invention. Like reference numerals as in FIG. 1 indicate like parts for convenience. Indicated at 50 is a solution sprayer for spraying a solution of a compound of a rare earth element used as a solute. The sprayed solution is fed through a feed control unit 52 to a solution feed pipe 18. The solution feed pipe 18 has a nozzle at a tip thereof provided at the side of the reaction tube as described later. The solution feed pipe 18 is driven at a given speed by means of a drive unit 54 so that the nozzle is moved in the quartz reaction tube 4 along the length of the reaction tube 4.

FIGS. 9A–9D are diagrams of a sequence of production steps of an optical fiber preform according to a preferred embodiment of the second process of the invention, wherein like reference numerals as in the first process indicate like parts.

Figure 9A:
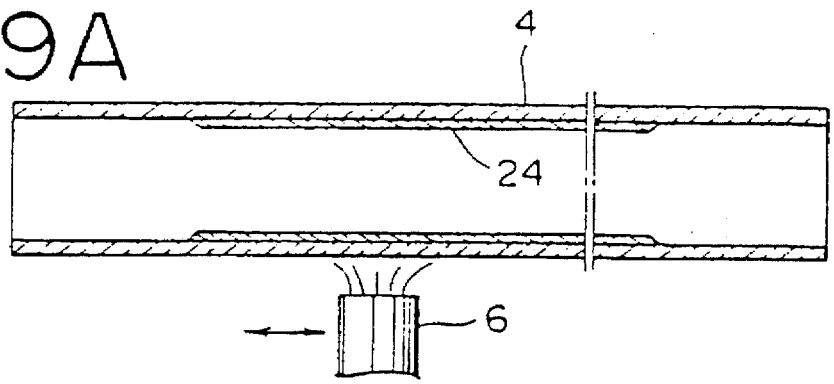
FIGS. 9A–9D are, respectively, diagrams of production steps of an optical fiber preform according to a preferred embodiment of the second process of the invention.

As shown in FIG. 9A, the clad glass film 24 is formed on the inner walls of the quartz reaction tube 4.

Figure 9B:
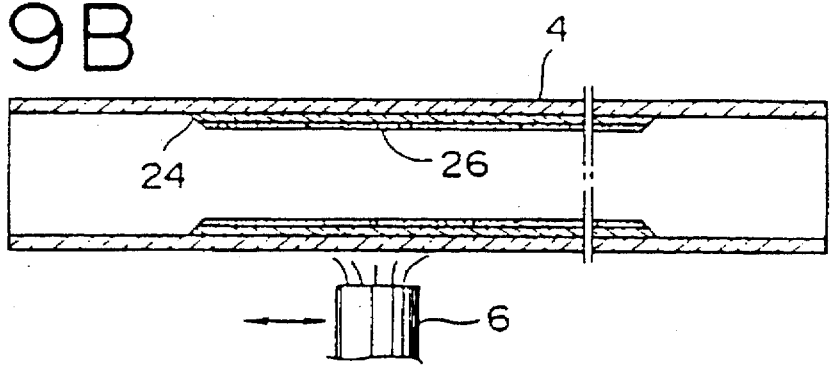

Subsequently, the soot-like core glass 26 is formed on the clad glass film 24 as is shown in FIG. 9B.

Figure 9C:
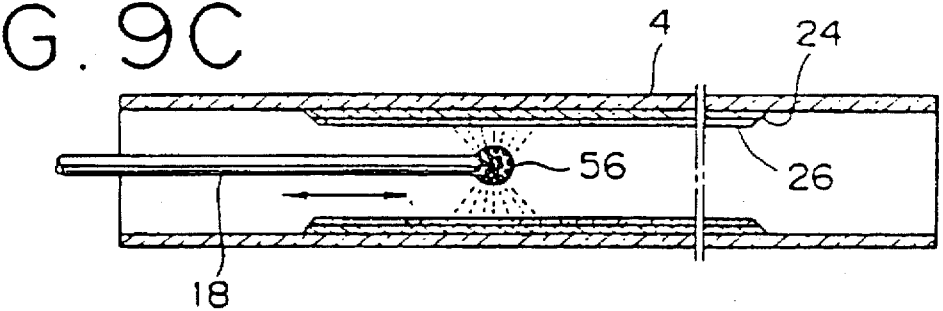

When the quartz reaction tube 4 and the like are cooled down to an appropriate temperature, the solution feed pipe 18 is moved at a given speed along the length of the reaction tube 4 while spraying an atomized solution from a nozzle 56 which has been attached at a tip of the solution feed pipe 18 or has been directly formed at the tip as shown in FIG. 9C. The atomized solution is sprayed over the soot-like core glass 26 and impregnated in the porous soot-like core glass 26. The movement of the solution feed pipe 18 at a given speed ensures uniform impregnation of the solution along the length of the reaction tube 4. Thus, the resultant optical fiber preform has a uniform concentration of the doped rare earth element in the optical fiber preform along its length. The solution is sprayed while rotating the reaction tube 4, so that the amount of impregnated solution in the soot-like core glass 26 can be made uniform along the circumference of the reaction tube 4. The impregnation amount of the solution which influences the concentration of the doped rare earth element can be controlled by controlling the concentration or feed of the solution or the speed of movement of the solution feed pipe 18. The solution may be formulated in the same manner as in the embodiments of the first process.

Figure 9D:
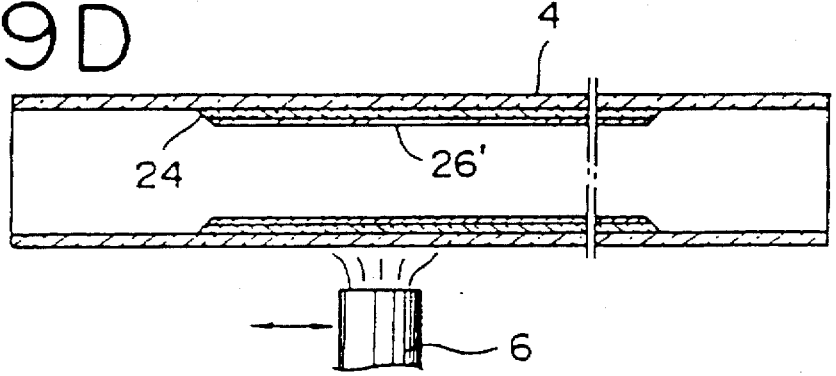

After dehydration, the porous soot-like core glass 26 is consolidated as shown in FIG. 9D, thereby forming a core glass film 26' on the clad glass film 24.

Finally, the entirety is collapsed to obtain an optical fiber preform. The vitrification step of the soot-like core glass 26 may not be carried out, but the collapsing may be effected in the form of the soot-like core glass 28.

In the second process of the invention, since the solution is atomized and impregnated in the soot-like core glass, the removal of the reaction tube from the lathe is not necessary with good workability. If the impregnation of the solution in the soot-like core glass is repeated a plurality of times, the workability becomes more pronounced. The nozzle 56 can be removed or inserted from one side of the reaction tube 4. Accordingly, this arrangement is suitable for keeping a closed system including the feed system of starting gases. If the closed system is maintained, there is little possibility that impurities can enter into the reaction tube 4 to degrade loss and other characteristics.

With the second process of the invention, substantially all the amount of the solution which has been sprayed in the form of a mist is impregnated in the soot-like core glass irrespective of the grain size of the soot-like core glass and other conditions. This permits the concentration of the doped rare earth element in the core to be controlled with high accuracy. More particularly, in the case of the process where the reaction tube in which the soot-like core glass has been formed is immersed in a solution, the amount of solution impregnated in the soot-like core glass will be saturated. Accordingly, the amount of impregnation of the solution depends fully on the state of the soot-type core glass. On the other hand, according to the second process of the invention, depending on the amount of the sprayed solution, the amount of the solution impregnated in the soot-like core glass is not saturated, so that the the amount of the impregnated solution is not influenced by the state of the soot-like core glass. Accordingly, the doping concentration can be controlled with high accuracy by proper control of the amount of spray of the solution.

When the second process of the invention is performed in such a way that the formation of the soot-like core glass (first step), impregnation of the atomized solution in the soot-like core glass (second step) and consolidation of the soot-like core glass (third step) are repeated in this order provided that the amount of spray of the solution is gradually increased whenever the second step is repeated, it becomes possible that the rare earth element is present at a higher concentration at the central portion of the core, leading to realization of a doped fiber suitable for efficient light amplification.

In the second process of the invention, the soot-like core glass may be formed directly on the inner walls of the reaction tube as in the case of the first process.

Figure 10:
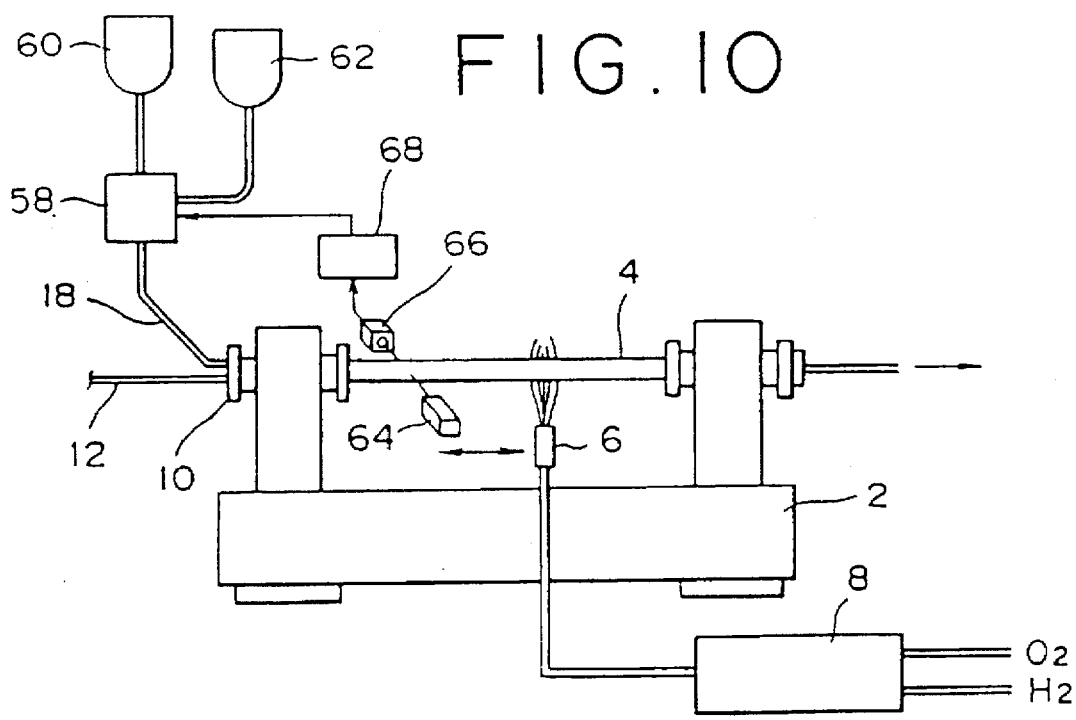
FIG. 10 is a schematic diagram of an arrangement of an optical fiber preform-producing apparatus used to carry out a third process of the invention.

FIG. 10 is a diagram of a main part of an optical fiber preform-producing apparatus used to carry out the third process of the invention. In the figure, like reference numerals as in the apparatus of FIG. 1 indicate like parts and are not explained. Indicated at 58 is a mixer to which the solution feed pipe 18 is connected. The mixer 58 has the function of mixing a highly concentrated solution of a rare earth element compound, as a solute, fed from a solution tank 60 and a diluent from a diluent tank 62 at a given mixing ratio and feeding the resulting mixture to the solution feed pipe 18. Reference numeral 64 indicates a laser device for irradiating a laser beam, such as a He—Ne laser beam, onto a quartz reaction tube 4. The laser beam transmitted through the reaction tube 4 is received by a light receiver 66. The output signal from the receiver 66 is inputted to a control circuit 68 by which the mixing ratio in the mixer 58 is controlled. The output signal level of the light receiver 66 corresponds to a transmitted light intensity, so that the concentration of the doped rare earth element can be controlled depending on the transmitted light intensity.

FIGS. 11A–11E are diagrams of a sequence of production steps of an optical fiber preform according to a preferred embodiment of the third process of the invention. In these figures, like reference numerals as in the embodiments of the first and second processes indicate like parts.

Figure 11A:
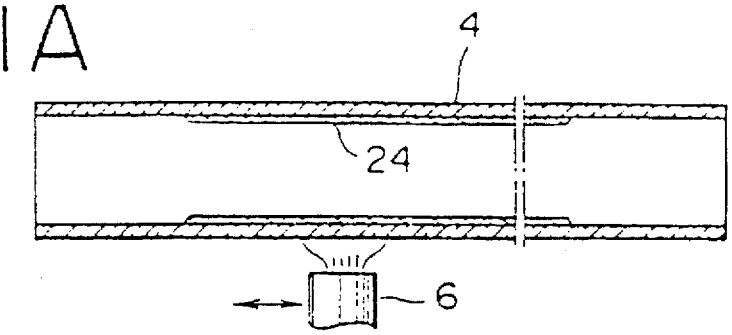
FIGS. 11A–11E are, respectively, diagrams of production steps of an optical fiber preform according to a preferred embodiment of the third process of the invention.
Figure 11B:
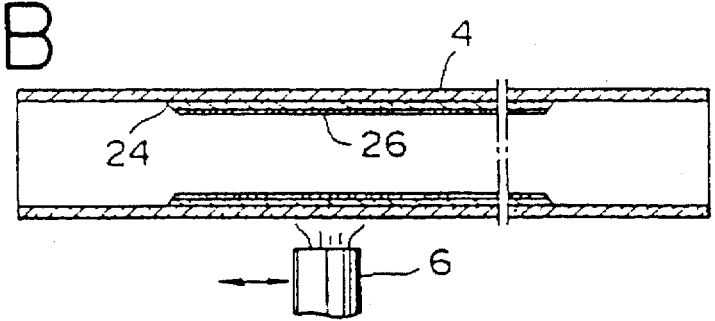

As shown in FIGS. 11A and 11B, the clad glass film 24 and the soot-like core glass 26 are formed on the inner walls of the quartz reaction tube 4.

Figure 11C:
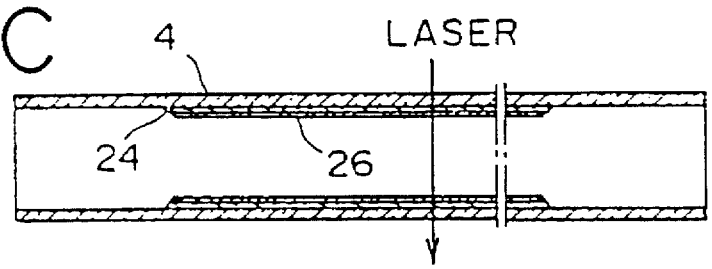

Further, as shown in FIGS. 11C and 12, a laser beam is irradiated on the quartz reaction tube 4 in which the clad glass film 24 and the soot-like core glass 26 have been formed to measure a quantity of transmitted light. In order to obtain good reproducibility of the relation between the quantity of transmitted light and the density of the soot-like core glass 26, the light path of the beam emitted from a laser device 64 should be invariably in position with respect to the reaction tube 4. Preferably, the light path should be at the central axis of the reaction tube 4.

The relation between the density of the soot-like core glass 26 and the quantity of transmitted light is schematically illustrated in FIGS. 13A and 13B. When the grain size of the soot-like core glass 26 is large with a relatively low density as shown in FIG. 18A, the scattering and the frequency of the Fresnel reflection of the laser beam incident in the soot-like core glass 26 become low with a relatively large quantity of transmitted light. When the density of the soot-like core glass 26 is low, the space occupation rate of the glass becomes relatively low. For the impregnation of the solution in the soot-like core glass 26, the amount of the solution capable of being impregnated in unit volume increases. Accordingly, in order to obtain a concentration of the doped rare earth element at the same level as for the soot-like core glass 26 with a high density, the concentration of the solution controlled to be low. On the other hand, when the soot-like core glass 26 has a small grain size and a high density as shown in FIG. 13B, the scattering and the reflection frequency of the laser beam incident in the soot-like core glass 26 become high, with a relatively small quantity of transmitted light. The high density of the soot-like core glass 26 results in a relatively high space occupation rate, leading to a reduction in the amount of solution to be impregnated in unit volume. In order to obtain a concentration of doped rare earth element at the same level as in the case where the soot-like core glass has a low density, the concentration of the solution to be impregnated should favorably be high.

Figure 11D:
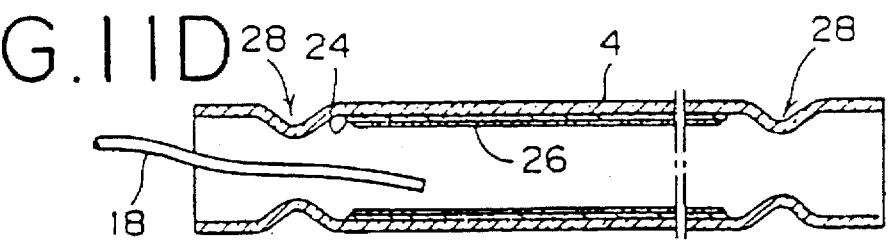
Figure 11E:
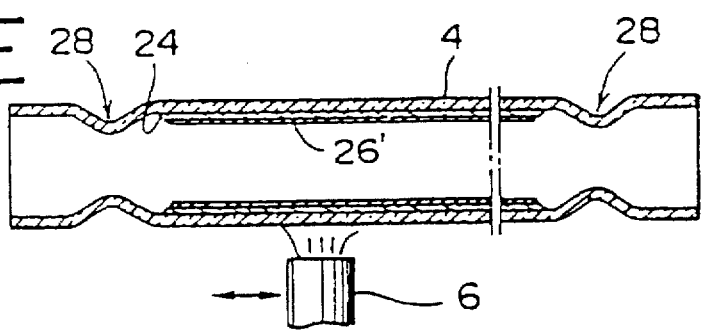

Based on the relation between the density of the soot-like core glass 28 and the quantity of transmitted light, the solution whose concentration is controlled depending on the quantity of transmitted light is charged into the reaction tube 4 in the step shown in FIG. 11D. To avoid leakage of the charged solution from the sides of the reaction tube 4, the constricted portions 28 are formed prior to charging the solution, like the embodiment of the first process. Based on the principle illustrated with reference to FIGS. 13A and 13B, the concentration of the solution is controlled within a range of 0.001–1 wt % and the amount is, for example, in the range of 5–20 ml. The diluent may be a solvent for the solution. The control in concentration of the solution to be impregnated in the soot-like core glass as in this embodiment will make a given concentration of the rare earth element being doped in the core irrespective of the properties of the soot-like core glass.

Subsequent steps are the same as those used in the first and second processes and are not illustrated herein.

Figure 14:
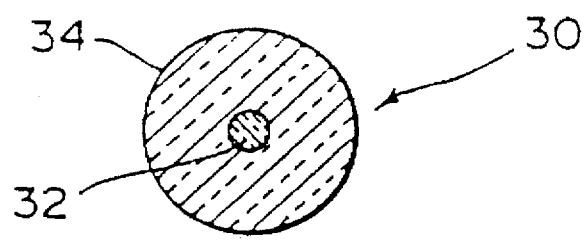
FIG. 14 is a cross-sectional view of an optical fiber preform obtained in the embodiment of the third process of the invention.

The cross section of the thus obtained optical fiber preform is shown in FIG. 14. The optical fiber preform obtained after collapsing is composed of the core-forming portion 32 which is formed into a core after drawing and the clad-forming portion 34 which is formed into a clad.

When the concentration of Er in the solution is controlled at 1% for production of an optical fiber preform, the concentration of the doped Er in the core-forming portion 32 can be controlled within a range of 10–5000 ppm at an accuracy of ±20%. Taking into account an accuracy of prior art of ±100%, it will be apparent that the control of the doping concentration is very accurate.

It is known that with doped fibers, a gain is produced only at input light power which is greater than a predetermined level of input light power of pumping light. Any light amplification is not made at a smaller level of light power. In view of not only the above fact but also the fact that the mode field of propagation light of an optical fiber makes the Gaussian distribution, efficient light amplification becomes possible by controlling the doping concentration such that the concentration is higher at the central portion of the core, provided that the total amount of the rare earth element present in the core is at a given level. For instance, when the concentration of a doped rare earth element is made constant along the radial direction of the core, light power becomes smaller at portions in the vicinity of the circumference of the core with an increasing loss by absorption. In contrast, the doping concentration is positively increased at the central portion of the core at which sufficient light power for causing a gain is produced, enabling one to amplify light in an efficient manner.

Figure 15:
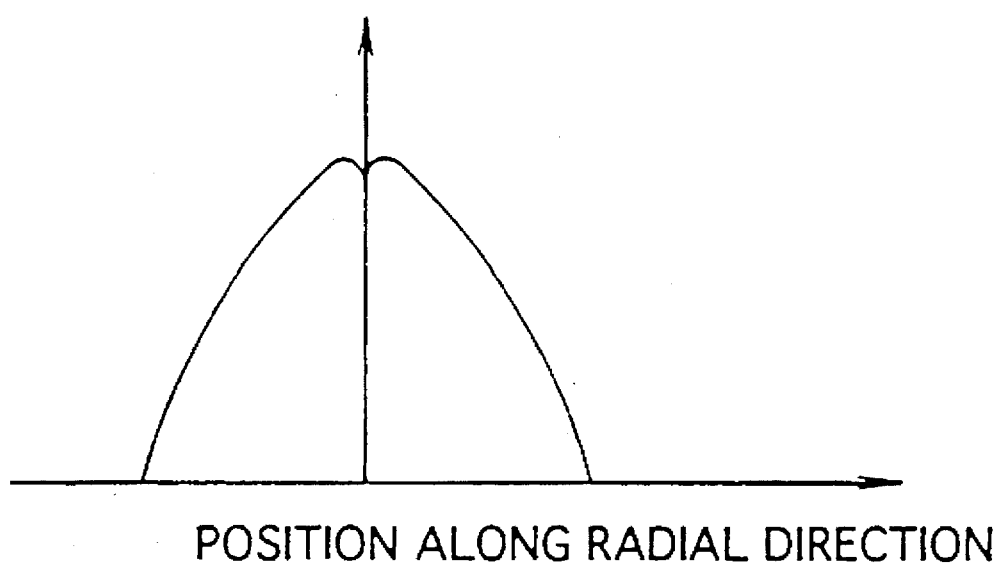
FIG. 15 is a graph showing an Er-doping concentration along the radial direction of the optical fiber preform.

For obtaining a concentration distribution in which the doping concentration is higher at the central portion of the core in the third process of the invention, the following procedure is performed, for example. The formation of the soot-like core glass 28 in the reaction tube 4 (first step), measurement of a quantity of transmitted light (second step), impregnation of the solution in the soot-like core glass 26 (third step) and consulation of the soot-like core glass 26 (fourth step) are repeated a plurality of times in this order. At the same time, the concentration of the solution controlled in high accuracy is increased whenever the above procedure is repeated. The distribution in concentration of Er in the core-forming portion 30 along the radial direction of the resultant optical fiber preform is made higher with respect to the concentration of Er at the central portion of the core as shown in FIG. 15. The doped fiber obtained by drawing the optical fiber preform has the distribution of the Er concentration similar to that of the optical fiber preform. Thus, it becomes possible to produce a doped fiber suitable for efficient light amplification.

FIGS. 16A–16E are illustrative views showing a sequence of the production steps of an optical fiber preform according to a preferred embodiment of the fourth process of the invention. In this embodiment, the optical fiber preform-producing apparatus shown in FIG. 1 is used to directly form the soot-like core glass on the inner walls of the quartz reaction tube.

Initially, while the quartz glass tube 4 in which starting gases and a carrier gas are fed are rotating, the reaction tube 4 is heated from outside with the burner 6 which is being moved at a given speed, for example, from the left to right side as viewed in the figure. An oxide glass fine powder is deposited in the reaction tube 4. The fine powder is heated with the burner 6 to form a first layer of a soot-like core glass 26A as shown in FIG. 26A.

Figure 16A:
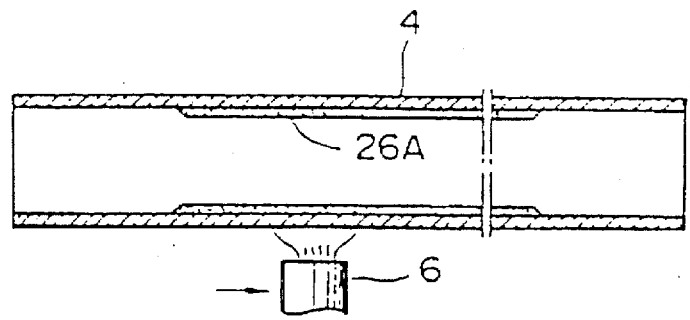
FIGS. 16A–16E are, respectively, diagrams of the production steps of an optical fiber preform in a preferred embodiment of a fourth process of the invention.
Figure 16B:
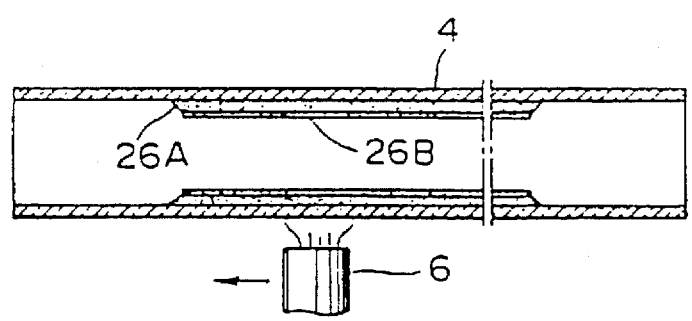

Subsequently, a composition of starting gases and a heating temperature are controlled as desired, under which the reaction tube 4 is again heated from outside with the burner moving at a given speed from the right to left side as viewed In the figure, thereby forming a second layer of a soot-like core glass 26B on the first layer of the soot-like core glass 26A as shown in FIG. 16B. The reason why the starting gas composition is differently controlled is to provide a core having a refractive index distribution by changing the concentration of $GeO_2$ or the like for control of the refractive index in the soot-like core glass in a stepwise manner. The reason why the heating temperature of the burner 6 is controlled is to change the density of the soot-like core glass thereby permitting the core to have a concentration distribution of the rare earth element.

Figure 16C:
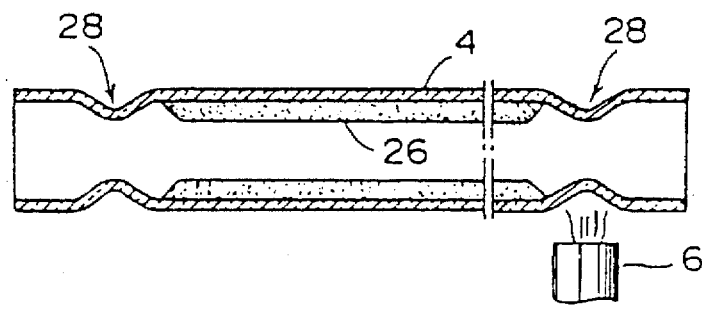
Figure 16D:
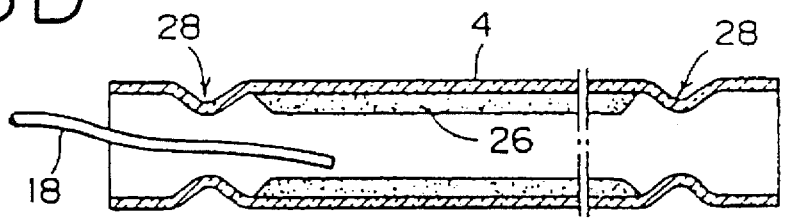

Similarly, a plurality of layers of soot-like core glass, e.g., five layers in total, are formed, thereby forming a soot-like core glass 26 as shown in FIG. 16C. The density of the soot-like core glass 26 is gradually decreased from the outside toward the inside. Such a density distribution may be obtained, for example, by lowering the heating temperature by about 50° C whenever the respective layers of the soot-like core glass are formed. Thereafter, the reaction tube 4 is formed with the constricted portions 28 as shown in FIG. 16C.

The solution feed pipe 18 is inserted into the reaction tube 4 to feed the solution thereinto. The concentration of the rare earth element to be doped in the optical fiber preform is determined depending on the amount of the solution to be impregnated in the soot-like core glass 26 in this step. The amount of the impregnated solution corresponds to the density of the soot-like core glass 26, so that the concentration distribution of the rare earth element may be arbitrarily set depending on the distribution of the density.

Figure 16E:
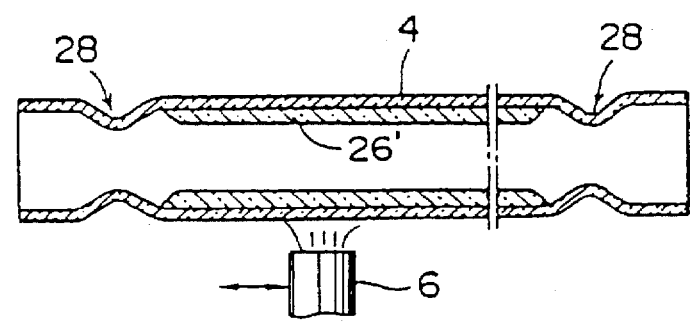

After dehydration, if necessary, the porous soot-like core glass 26 is consolidated as shown in FIG. 16E to form a core glass film 26' in the quartz reaction tube 22.

Finally, collapsing is effected to obtain an optical fiber preform. It will be noted that the consolidation and collapsing of the soot-like core glass 26 may be effected simultaneously. The impregnation of the solution in the soot-like core glass 26 may be effected by immersion of the reaction tube having the soot-like core glass in the solution.

Figure 17:
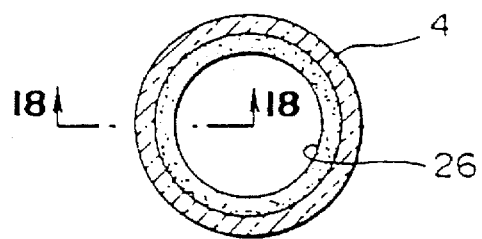
FIG. 17 is a cross-sectional view of a quartz reaction tube in which a soot-like core glass is formed according to an embodiment of the fourth process of the invention.
Figure 18:
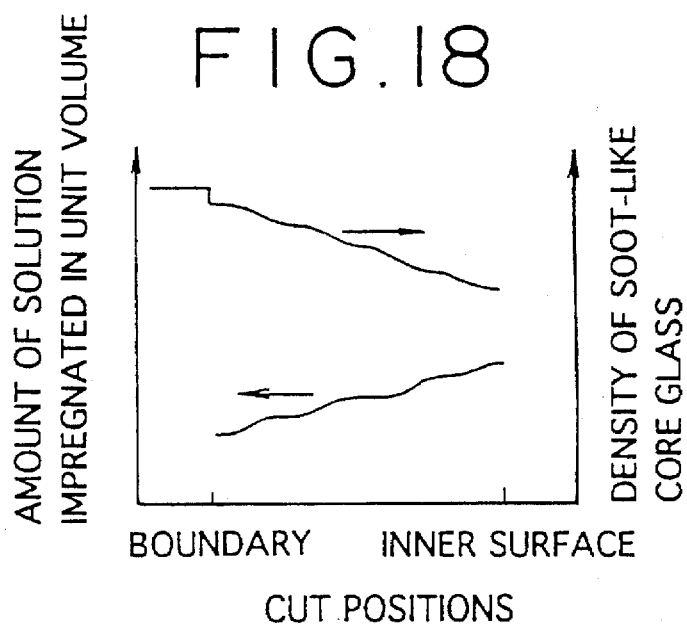
FIG. 18 is a schematic graph showing a distribution in density along the section of the soot-like core glass taken along line 18—18 of FIG. 17 and a distribution of an amount of a solution being impregnated in unit volume of the core glass.

FIG. 17 is a cross section of the quartz reaction tube 4 in which the soot-like core glass 26 has been formed. FIG. 18 is a graph schematically showing a distribution of density in the section of the soot-like core glass 26 taken along the line 18—18 of FIG. 17 and a distribution of the amount of the solution being impregnated in unit volume. The density of the soot-like core glass 26 gradually decreases from the boundary between the quartz reaction tube 4 and the soot-like core glass 26 toward the inner surface of the soot-like core glass 26. This entails the amount of the solution impregnated in unit volume which gradually increases from the boundary toward the inner surface.

Figure 19A:
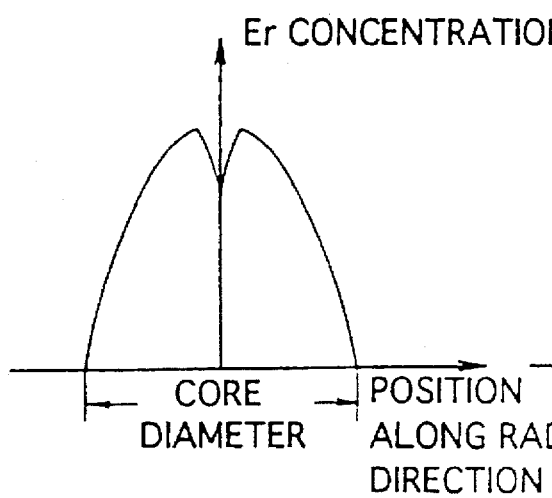
FIGS. 19A and 19B are graphs, respectively, of a concentration distribution of doped Er and a distribution in refractive index along the radial direction of the optical fiber preform obtained in the embodiment of the fourth process of the invention.
Figure 19B:
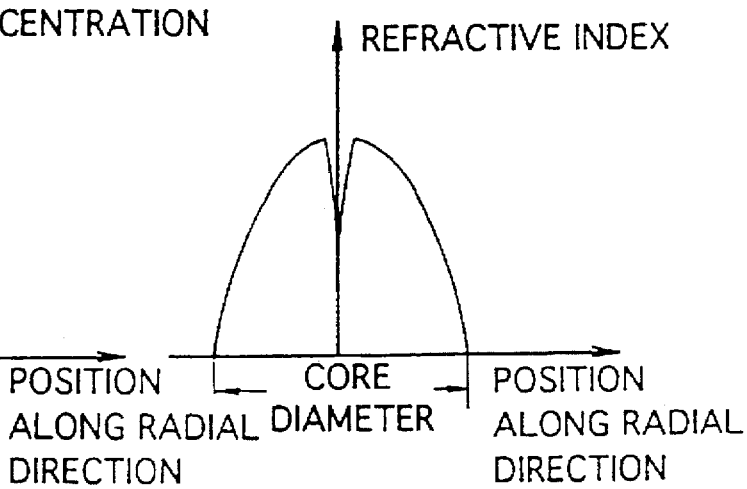

FIGS. 19A and 19B are, respectively graphs of a distribution in concentration of doped Er and a distribution of refractive index along the radial direction of the resultant optical fiber preform. As a result of the distribution in amount of the impregnated solution shown in FIG. 18, the concentration distribution is such that the Er concentration is higher at the central portion of the core. Thus, it will be possible to produce a doped fiber suitable for efficient light amplification.

For performing the fourth process of the invention, even though the concentration distribution of a rare earth element is set at an arbitrary level, the distribution of the refractive index will not be undesirably changed. This is because the concentration of a dopant such as $GeO_2$ which influences the refractive index has been determined on production of the oxide glass fine powder through the gas phase reaction without undergoing any influence of the density of the soot-like core glass. Accordingly, the concentration distribution of a rare earth element and the refractive index distribution may be independently set, respectively.

In the embodiment shown in FIG. 19B, the refractive index distribution is so determined that the refractive index is higher at the central portion of the core. However, as described above, the refractive index distribution can be controlled independently of the concentration distribution of Er, e.g. the refractive index along the radial direction of the core may be made constant as well.

In the embodiments of the first to fourth processes of the invention set out before, $ErCl_3 \cdot 6H_2O$ is used as the solute and ethanol is used as the solvent. Other solutes and solvents may be likewise used. The compounds of rare earth elements are preferably halides of rare earth elements but other compounds may also be used. Examples of the solvent alcohols other than ethanol and other solvents such as water may also be used.

When Er is doped, light with a wavelength band of 1.55 µm can be amplified by the use of pumping light with a wavelength of 0.98 µm or 1.48 µm. With Nd being doped, light with a wavelength band of 1.3 µm can be amplified using pumping light with a wavelength band of 0.8 µm. With a mixture of Er and Yb being doped, light with a wavelength band of 1.55 µm can be amplified using pumping light with a wavelength of 0.84 µm.

In order to realize a high gain over a wide wavelength band in the optical fiber amplifier using the doped fiber, it is effective to dope aluminium in the core aside from rare earth elements. Thus, the processes of the invention may be applied to doping of rare earth elements and aluminum. In this case, a solution of an aluminum compound as a solute may be an alcohol (e.g. ethanol) solution of $AlCl_3$. Although $ErCl_3$ used as a rare earth element compound is dissolved in alcohols only in the form of a hexahydrate ($ErCl_3 \cdot 6H_2O$), AlCl₃ is dissolved in an anhydrous form. When an alcohol solution of AlCl₃ is impregnated in a soot-like core glass, natural drying is sufficient, so that a dehydration step can be omitted. When the dehydration is effected by heating, an aluminum compound is liable to sublimate. In this sense, the omission of the dehydration step is effective in obtaining a satisfactory concentration of doped aluminum. From this point of view, it is preferred that a solution of a rare earth element compound as a solute is first impregnated in a soot-like core glass and heated for dehydration. Thereafter, a solution of an aluminium compound as a solute is impregnated in the soot-like core glass and dried at normal temperatures, followed by collapsing to obtain an optical fiber preform. The drawing of the thus obtained optical fiber preform can provide doped fibers having a high gain over a wide wavelength range.

As stated before, the process of producing an optical fiber preform according to the invention is applicable to the manufacture of doped optical fibers for optical fiber amplifiers wherein rare earth elements are doped in the core.

We claim:

1. A method of making an optical fiber preform doped with a rare earth element, comprising:
   (a) depositing a porous oxide glass layer along a length of an internal surface of a quartz reaction tube having a first inner diameter;
   (b) forming a pair of portions, each of the portions having a second inner diameter smaller than the first inner diameter, one of the portions positioned at each end of the length of the internal surface of the quartz reaction tube; and
   (c) providing a solution, including a rare earth element compounds between the pair of the portions to impregnate the porous oxide glass layer with the solution.

2. A method of making an optical fiber preform doped with a rare earth element, comprising:
   (a) feeding a gas into a quartz reaction tube having a first inner diameter, the gas including a compound to form an oxide glass;
   (b) heating the quartz reaction tube from outside thereof to deposit a porous oxide glass layer along a length of an internal surface of the quartz reaction tube;
   (c) forming a pair of portions of the quartz reaction tube, each of the portions having a second inner diameter smaller than the first inner diameter, one of the portions located at each end of the length of the internal surface of the quartz reaction tube; and
   (d) providing a solution, including a compound of a rare earth element, between the pair of the portions to impregnate the porous oxide glass layer with the solution.

3. A method of making an optical fiber with a rare earth element, comprising:
   (a) feeding a gas into a quartz reaction tube having a first inner diameter, the gas including a compound to form an oxide glass;
   (b) heating the quartz reaction tube from outside thereof to deposit a porous oxide glass layer along a length of an internal surface of the quartz reaction tube;
   (c) after said heating in step (b), forming a pair of portions of the quartz reaction tube, each of the portions having a second inner diameter smaller than the first inner diameter, one of the portions located at each end of the length of the internal surface of the quartz reaction tube;
   (d) providing a solution, including a rare earth element compound, between the pair of the portions to impregnate the porous oxide glass layer with the solution;
   (e) collapsing the quartz reaction tube by heating to form an optical fiber preform; and
   (f) drawing the optical fiber preform to form an optical fiber.

4. A method of making an optical fiber doped with a rare earth element, comprising:
   (a) feeding a gas into a quartz reaction tube having a first inner diameter, the gas including a compound to form an oxide glass;
   (b) heating, at a first temperature, the quartz reaction tube from outside thereof to deposit a first porous oxide glass layer along a length of an internal surface of the quartz reaction tube;
   (c) after said heating in step (b), heating, at a second temperature different from the first temperature, the quartz reaction tube to deposit a second porous oxide glass layer having a different density from the first porous oxide glass layer along the length of the internal surface of the quartz reaction tube;
   (d) forming a pair of portions, each of the portions having a second inner diameter smaller than the first inner diameter, one of the portions positioned at each end of the length of the internal surface of the quartz reaction tube;
   (e) providing a solution, including a rare earth element compound, between the pair of the portions to impregnate at least the second porous oxide glass layer with the solution;
   (f) collapsing the quartz reaction tube by heating to form an optical fiber preform; and
   (g) drawing the optical fiber preform to form an optical fiber.

5. A method of making an optical fiber doped with a rare earth element, comprising:
   (a) depositing a porous oxide glass layer onto an internal surface of quartz reaction tube having a first inner diameter;
   (b) heating the quartz reaction tube to form a pair of portions, each of the portions having a second inner diameter smaller than the first inner diameter, the pair of the portions located so that the internal surface of the quartz reaction tube between the pair of the portions includes the porous oxide glass layer;
   (c) providing a solution, including a rare earth element compounds between the pair of the portions to impregnate the porous oxide glass layer with the solution;
   (d) collapsing the quartz reaction tube by heating to form an optical fiber preform; and
   (e) drawing the optical fiber preform to form an optical fiber.

6. A method of making an optical fiber doped with a rare earth element, comprising:
   (a) depositing a porous oxide glass layer onto an internal surface of a quartz reaction tube having a first inner diameter;
   (b) forming a pair of portions of the quartz reaction tube, each of the portions having a second inner diameter smaller than the first inner diameter, the pair of the portions positioned to include the porous oxide glass layer between the pair of the portions;
   (c) providing a solution, including a compound of a rare earth element, between the pair of the portions to impregnate the porous oxide glass layer with the solution;

(d) collapsing the quartz reaction tube by heating to form an optical fiber preform; and (e) drawing the optical fiber preform to form an optical fiber.

7. A method of making an optical fiber including a doping material, comprising:

(a) feeding a gas into a quartz reaction tube having a first inner diameter, the gas including a compound to form an oxide glass;

(b) heating the quartz reaction tube from outside thereof to deposit a porous oxide glass layer onto an internal surface of the quartz reaction tube;

(c) heating the quartz reaction tube to form a pair of portions, each of the portions having a second inner diameter smaller than the first inner diameter, the pair of the portions located so that the internal surface of the quartz reaction tube between the pair of the portions includes the porous oxide glass layer;

(d) providing a solution, including a solute for the doping material, between the pair of the portions to impregnate the porous oxide glass layer with the solution;

(e) collapsing the quartz reaction tube by heating to form an optical fiber preform; and (f) drawing the optical fiber preform to form an optical fiber.

8. A method of making an optical fiber including a doping material, comprising:

(a) depositing a porous oxide glass layer onto an internal surface of a quartz reaction tube having a first inner diameter;

(b) forming a pair of portions of the quartz reaction tube, each of the portions having a second inner diameter smaller than the first inner diameter, the pair of the portions positioned to include the porous oxide glass layer between the pair of the portions;

(c) providing a solution, including a solute for the doping material, between the pair of the portions to impregnate the porous oxide glass layer with the solution;

(d) collapsing the quartz reaction tube by heating to form an optical fiber preform; and (e) drawing the optical fiber preform to form an optical fiber.

9. A method of impregnating an oxide glass layer with a rare earth element, comprising:

(a) feeding a gas into a quartz reaction tube having a first inner diameter, the gas including a compound to form an oxide glass;

(b) heating the quartz reaction tube from outside thereof to deposit a porous oxide glass layer along a length of an internal surface of the quartz reaction tube;

(c) heating the quartz reaction tube to form a pair of portions, each of the portions having a second inner diameter smaller than the first inner diameter, one of the portions positioned at each end of the length of the internal surface of the quartz reaction tube;

(d) providing a solution, including a rare earth element compounds between the pair of the portions; and (e) impregnating the porous oxide glass layer with the solution.

10. A method of impregnating an oxide glass layer with a rare earth element, comprising:

(a) heating a quartz reaction tube having a first inner diameter from outside thereof to deposit a porous oxide glass layer along a length of an internal surface of the quartz reaction tube;

(b) forming a pair of portions of the quartz reaction tube, each of the portions having a second inner diameter smaller than the first inner diameter, one of the portions located at each end of the length of the internal surface of the quartz reaction tube;

(c) providing a solution, including a compound of a rare earth element, between the pair of the portions; and (d) impregnating the porous oxide glass layer with the solution.

11. A method of impregnating an oxide glass layer with a rare earth element, comprising:

(a) feeding a gas into a quartz reaction tube having a first inner diameter, the gas including a compound to form an oxide glass;

(b) heating the quartz reaction tube from outside thereof, while the gas is inside the quartz reaction tube, to deposit a porous oxide glass layer along a length of an internal surface of the quartz reaction tube;

(c) after said heating in step (b), forming a pair of portions of the quartz reaction tube, each of the portions having a second inner diameter smaller than the first inner diameter, one of the portions located at each end of the length of the internal surface of the quartz reaction tube;

(d) providing a solution, including a rare earth element compound, between the pair of the portions; and (e) impregnating the porous oxide glass layer with the solution.

12. A method of impregnating an oxide glass layer with a rare earth element, comprising:

(a) feeding a gas into a quartz reaction tube having a first inner diameter, the gas including a compound to form an oxide glass;

(b) heating, to a first temperature, the quartz reaction tube from outside thereof, while the gas is inside the quartz reaction tube, to deposit a first porous oxide glass layer along a length of an internal surface of the quartz reaction tube;

(c) after said heating in step (b), heating, to a second temperature different from the first temperature, the quartz reaction tube to deposit a second porous oxide glass layer having a different density from the first porous oxide glass layer along the length of the internal surface of the quartz reaction tube;

(d) heating the quartz reaction tube to form a pair of portions, each of the portions having a second inner diameter smaller than the first inner diameter, one of the portions positioned at each end of the length of the internal surface of the quartz reaction tube;

(e) providing a solution, including a rare earth element compound, between the pair of the portions; and (f) impregnating at least the second porous oxide glass layer with the solution.

13. A method of doping an oxide glass layer with a rare earth element, comprising:

(a) feeding a gas into a quartz reaction tube having a first inner diameter, the gas including a compound to form an oxide glass;

(b) heating the quartz reaction tube from outside thereof to deposit a porous oxide glass layer onto an internal surface of the quartz reaction tube;

(c) heating the quartz reaction tube to form a pair of portions, each of the portions having a second inner diameter smaller than the first inner diameter, the pair of the portions located so that the internal surface of the quartz reaction tube between the pair of the portions includes the porous oxide glass layer;

(d) providing a solution, including a rare earth element compounds between the pair of the portions.

14. A method of doping an oxide glass layer with a rare earth element, comprising:

(a) depositing a porous oxide glass layer onto an internal surface of a quartz reaction tube having a first inner diameter;

(b) forming a pair of portions of the quartz reaction tube, each of the pair of the portions having a second inner diameter smaller than the first inner diameter, the pair of the portions positioned to include the porous oxide glass layer between the pair of the portions; and (c) providing a solution, including a compound of a rare earth element between the pair of the portions.

15. A method of impregnating an oxide glass layer with a rare earth element, comprising:

(a) feeding a gas into a quartz reaction tube having a first inner diameter, the gas including a compound to form an oxide glass;

(b) heating the quartz reaction tube from outside thereof to deposit a porous oxide glass layer onto an internal surface of the quartz reaction tube;

(c) heating the quartz reaction tube to form a pair of portions, each of the portions having a second inner diameter smaller than the first inner diameter, the pair of the portions located so that the internal surface of the quartz reaction tube between the pair of the portions includes the porous oxide glass layer;

(d) providing a solution, including a solute for the doping material, between the pair of the portions; and (e) impregnating the porous oxide glass layer with the solution.

16. A method of doping an oxide glass layer with a rare earth element, comprising:

(a) heating a quartz reaction tube having a first inner diameter from outside thereof, while a gas, including a compound to form an oxide glass, is inside the quartz reaction tube, to deposit a porous oxide glass layer onto an internal surface of the quartz reaction tube;

(b) forming a pair of portions of the quartz reaction tube, each of the portions having a second inner diameter smaller than the first inner diameter, the pair of the portions positioned to include the porous oxide glass layer between the pair of the portions; and (c) providing a solution, including a solute for the rare earth element, between the pair of the portions.

* * * * *